Figure 1:
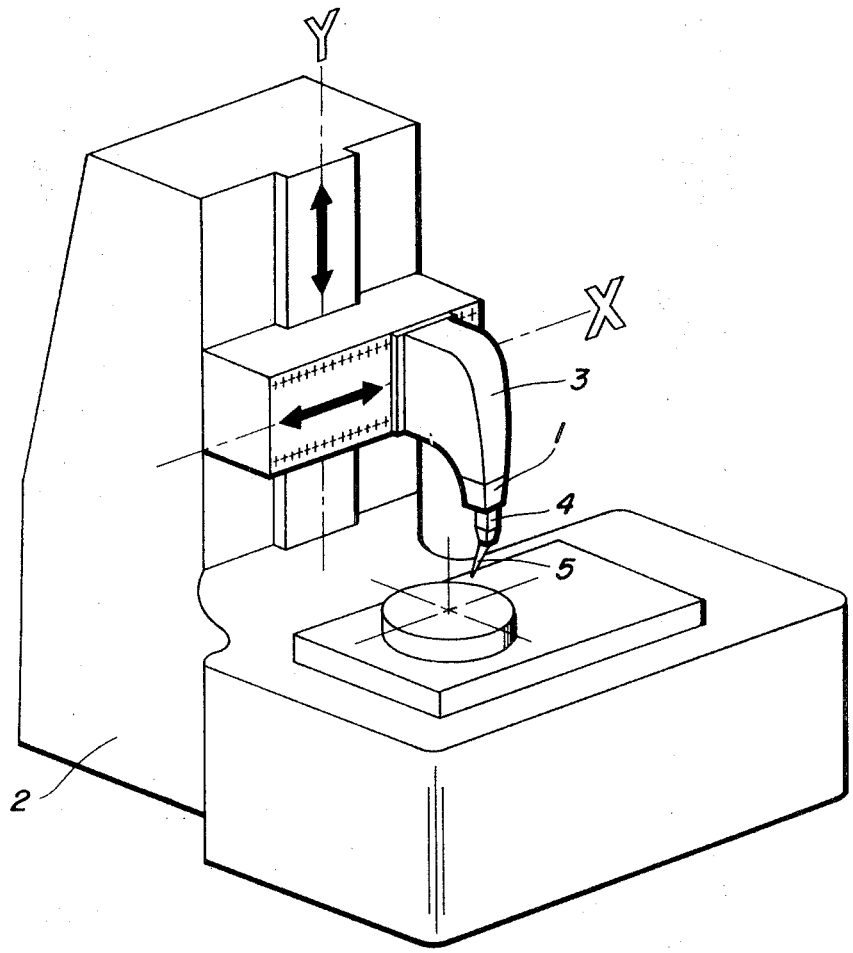

United States Patent

[11] 3,596,506

| [72] | Inventor | Andy R. Wilson, Jr.<br>Los Alamos, N. Mex. |
|---|---|---|
| [21] | Appl. No. | 810,282 |
| [22] | Filed | Mar. 25, 1969 |
| [45] | Patented | Aug. 3, 1971 |
| [73] | Assignee | The United States of America as represented by the United States Atomic Energy Commission |

[54] TOOL FORCE MONITOR
2 Claims, 4 Drawing Figs.

[52] U.S. Cl. .................................................. 73/133, 73/78, 73/104
[51] Int. Cl. .................................................. G01l 5/00
[50] Field of Search ........................................ 73/78, 104, 133, 140, 141, 189, 885

[56] References Cited
UNITED STATES PATENTS
2,829,516  4/1958  Chiesorin ..................... 73/133

| 3,213,953 | 10/1965 | Flinth ........................... | 73/141 (X) |
|---|---|---|---|
| 3,279,246 | 10/1966 | Seasholtz ....................... | 73/141 |
| 3,308,657 | 3/1967 | Kus .............................. | 73/140 |

FOREIGN PATENTS
662,098  7/1938  Germany ..................... 73/133

*Primary Examiner*—Charles A. Ruehl
*Attorney*—Roland A. Anderson

ABSTRACT: A device for use during single point tool turning operations on lathes to monitor and limit tool force with additional utility as an adaptive control sensing mechanism. Four compressible load cells produce electrical signals proportional to the force exerted upon them. The load cells are located and entrapped between two parallel plates that are connected by a pivot or flexure joint and the entire device is positioned between the tool and tool bar.

PATENTED AUG 3 1971

3,596,506

SHEET 1 OF 2

INVENTOR.
Andy R. Wilson, Jr.

BY

INVENTOR.
Andy R. Wilson, Jr.

TOOL FORCE MONITOR

The invention described herein was made in the course of, or under, a contract with the U.S. Atomic Energy Commission.

This invention relates to the art of machining. More specifically, this invention relates to a tool force monitoring device that can also be used to limit tool force or as an adaptive control system component. The invention is useful in connection with turning operations. In general, a turning operation consists of rotating a workpiece about an axis and introducing an edged tool to an outer surface of the workpiece thereby separating chips from the main body. The finished workpiece produced depends upon the shape of the tool used and the path it traverses.

If the tool deviates from the intended path, a serious hazard to personnel can result. In addition, the workpiece may be damaged or the tool broken. There are a number of factors, mechanical and/or electrical, that may cause the tool to deviate from its intended path. A great number of machines are numerically controlled, and a programming error or a faulty tape reading may cause the tool to go astray. A scanner system that is frequently used as a safety device employs a black-on-white tool path plot which is identical to the programmed path of the cutting tool. A photoelectric eye whose movement duplicates the movement of the cutting tool is caused to follow the tool path plot and if the photoelectric eye leaves the plot the photoelectric eye detects the error and causes an interlock to shut down the machine automatically. However, this system has been found to be less than foolproof because the cutting tool can exceed the desired feed rate while remaining on the controlled tool path plot. The scanner system, not being sensitive to velocity, does not shut down the machine when the actual feed rate exceeds the desired rate. As a result, excessively high tool forces are generated. In addition, the lack of sensitivity of a scanner system permits a relatively large tool path deviation before it detects the error.

It would be difficult, if not impossible, to design a system that would prevent tool path deviation. With certain operating conditions and workpiece materials it is quite acceptable to have an occasional tool path deviation, and the added cost required to prevent the deviation would not be justified by the small damage that results. However, with other conditions and materials it is imperative that tool path deviation be prevented. Such a situation would exist when a very valuable workpiece is being machined or when explosives are being machined.

The present invention provides a device that detects tool path deviation through a rise in tool force. It provides a signal that can be used to constantly monitor the tool force. This signal can also be used to stop the machine if the tool force exceeds a preset limit, or to modify the feed rate and/or spindle speed of the machine. This is accomplished by a device located between the tool holder and tool bar.

It is therefore an object of this invention to provide a device that can be used to monitor tool force. It is a further object of this invention to provide a device that can be used to limit the tool force to acceptable levels. It is a still further object of this invention to provide a device that will assist in controlling the machine.

Figure 2:
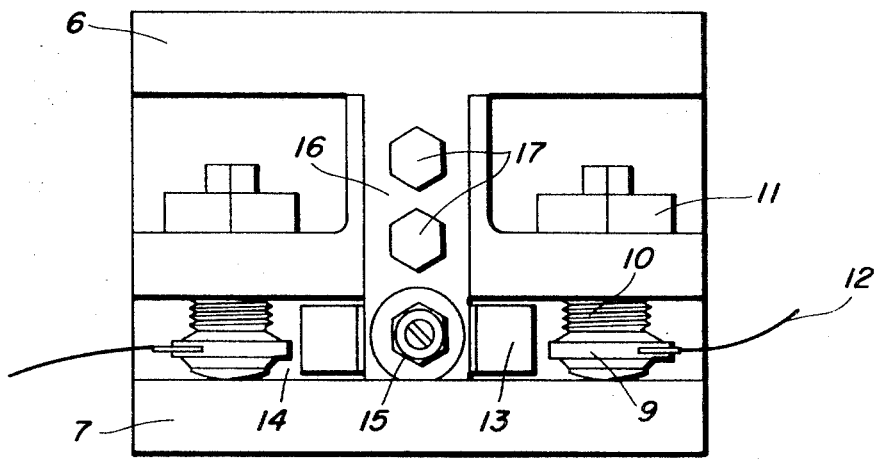
Figure 3:
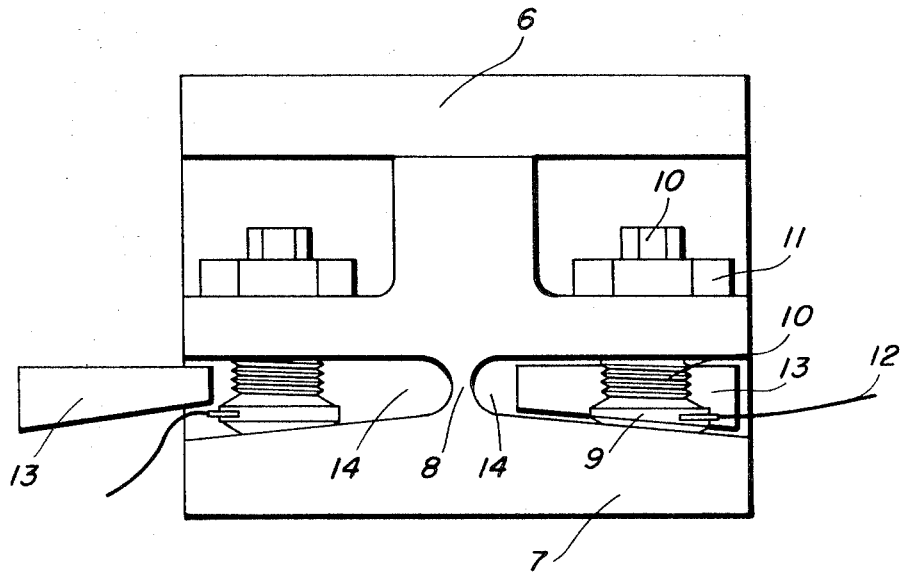
Figure 4:
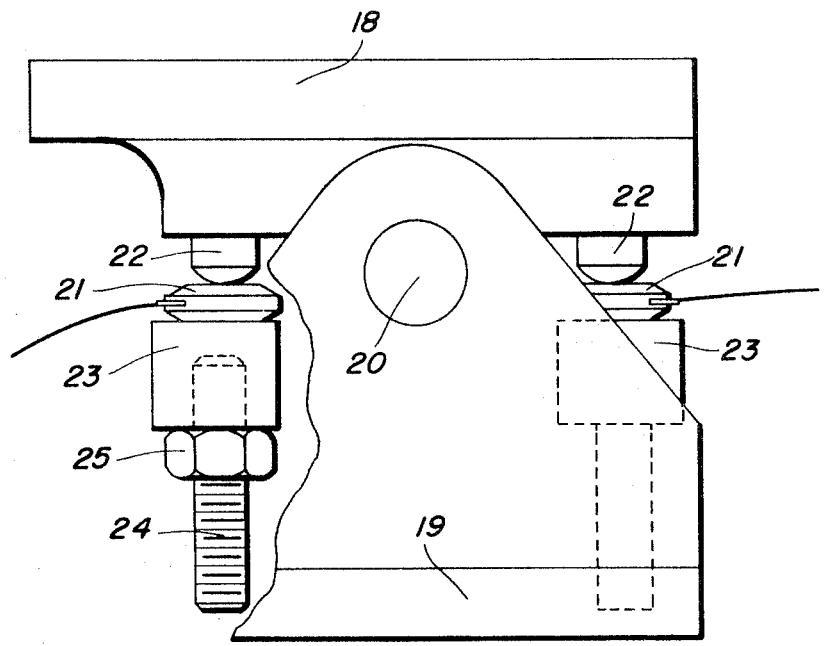

The above and other objects will be more apparent from a consideration of the following description when taken in conjunction with the accompanying drawings wherein:

FIG. 1 shows the tool force monitor 1 positioned between the tool holder 4 and tool bar 3 on a two-axis vertical lathe, FIG. 2 is a front view of the monitor, FIG. 3 is a side view of the monitor, and FIG. 4 is a side view of another embodiment of the monitor.

The tool force monitor 1 is shown in position between the tool holder 4 and tool bar 3 on a vertical lathe 2 in FIG. 1. The lathe provides movement between tool 5 and the workpiece along two axes, the horizontal or X-axis and the vertical or Y-axis. The monitor will work with any type of machine that generates surfaces of revolution by material removal with a single point cutting tool.

One embodiment of the tool force monitor is shown in detail in FIGS. 2 and 3. FIG. 2 is a front view of the monitor and FIG. 3 is a side view. Plate 6 is attached to the tool bar of the vertical lathe and plate 7 is attached to the tool holder in which the cutting tool is secured. Flexure joint 8 (shown in FIG. 3) is contained within plate 7, but in effect connects the plates 6 and 7 and forms a flexure joint. Four commercially available compressive load cells 9 are trapped, in effect, between plates 6 and 7, with two on each side of the flexure joint. These load cells 9 are each preloaded to a specific compressive load. Adjustment in compressive load is provided by a threaded bolt 10 and jam nut 11 for each load cell. Electrical leads 12 transmit the signal from each individual load cell and the leads are wired so as to combine the signals of all four load cells. Any variation in the preload, which is manifested as tool force during operation, generates a voltage unbalance which is proportional to the torque moment around the flexure joint 8 and which can be measured by the usual Wheatstone bridge circuit (not shown). The output of this device can be used for a number of purposes including monitoring the tool force, limiting the tool force, and controlling the feed rate and/or spindle speed of the machine. For use as a monitor, the output signal of the combined load cells may be amplified and connected to a commercially available meter as the means of displaying the actual tool force being generated during machine operations. The operator can monitor the tool force, and if the indicating needle on the meter exceeds acceptable levels, the machine can be shut down by the operator. If the device is used to monitor and limit the tool force, the output signal may be amplified and connected to a commercially available meter relay. The actual tool force can then be compared with a preset signal level at the meter relay which will be selected by the operator to represent the maximum tool force permitted. When the actual tool force output signal exceeds said preset meter relay signal, the machine will automatically be shut down. If the device is to be used as part of an adaptive control system, the actual tool force signal can be used to maintain constant tool force by varying other machining parameters such as feed rates and/or spindle speeds.

The device is also provided with stop mechanisms that will protect the load cells when machining forces would create excessive compressive forces across the load cells. These stop mechanisms also provide adequate stiffness for the higher load level applications. They consist of two wedges 13 which are fitted closely in, and conforming to, openings 14 provided in plate 7. Positioning of these wedges is accomplished by a threaded mechanism 15 which is supported by plates 16 and bolts 17. By moving wedges 13 deeper into openings 14, adjustment of the stop mechanisms is achieved and the rotation of plate 7 with respect to plate 6 is controlled.

FIG. 4 shows another embodiment of the force monitor. Plate 18 is attached to the tool bar of a vertical lathe and plate 19 is attached to the tool holder in which the cutting tool is secured. Pin 20 connects plates 18 and 19 and thereby forms a pivot joint. Load cells 21 are held in place by four tooling buttons 22 and two walking beams 23. Said walking beams 23 are preloaded against load cells 21 by adjustment of the two threaded columns 24 and two jam nuts 25.

What I claim is:

1. A tool force monitor to limit force during turning operations on a lathe comprising two plates held in a parallel position by a substantially planar flexure joint connecting the two plates and four compressible load cells with electrical leads entrapped between said plates, one of said plates being attached to the tool bar of the lathe, and the other plate being attached to the tool holder of the lathe, and two of said load cells situate on each side of said flexure joint.

2. The device of claim 1 including stop means between said plates to prevent damage to said load cells, said stop means comprising screw adjustable wedges.